United States Patent [19]

Schepers et al.

[11] Patent Number: 4,468,487

[45] Date of Patent: Aug. 28, 1984

[54] POLYMER COMPOSITION COMPRISING NITRILE COPOLYMER, CPE AND RUBBER

[75] Inventors: Herman A. J. Schepers, Stein; Wilhelmus A. M. Debets, Sittard, both of Netherlands

[73] Assignee: Stamicarbon B.V., Geleen, Netherlands

[21] Appl. No.: 423,313

[22] Filed: Sep. 24, 1982

[30] Foreign Application Priority Data

Sep. 25, 1981 [NL] Netherlands .................. 8104413

[51] Int. Cl.³ ................. C08L 23/28; C08L 25/12; C08L 19/00
[52] U.S. Cl. .................................. 524/87; 524/100; 525/192; 525/211; 525/215; 525/230; 525/233; 525/238
[58] Field of Search ............... 525/192, 211, 230, 233, 525/238; 524/87

[56] References Cited

U.S. PATENT DOCUMENTS

| | | | |
|---|---|---|---|
| 3,819,763 | 6/1974 | Akane et al. | 525/238 |
| 4,341,884 | 7/1982 | Schepers | 525/232 |
| 4,341,885 | 7/1982 | Schepers | 525/232 |

FOREIGN PATENT DOCUMENTS 1582280 1/1981 United Kingdom .

Primary Examiner—Carman J. Seccuro
Attorney, Agent, or Firm—Cushman, Darby & Cushman

[57] ABSTRACT

Disclosed is an impact-resistant polymer composition based on a copolymer of an unsaturated nitrile, a substantially saturated rubber and a chlorinated polyethylene. To maintain high impact resistance while retaining good processing properties, the polymer composition comprises:

A. 40–95 parts by weight of at least one copolymer obtained by polymerizing a mixture of:
  (1) 10–90 weight % of one or more monomers selected from the group consisting of styrene and derivatives thereof, and
  (2) 90–10 weight % of one or more monomers selected from the group containing of acrylonitrile and methacrylonitrile; and B. 5–60 parts by weight of a mixture comprising:
  (1) a substantially saturated rubber, and
  (2) chlorinated polyethylene having a chlorine content of from 32 to 45 weight %, a DSC crystallinity viscosity of at least 1.0, and wherein the weight ratio between rubber and chlorinated polyethylene is from 2:1 to 1:10.

7 Claims, No Drawings

POLYMER COMPOSITION COMPRISING NITRILE COPOLYMER, CPE AND RUBBER

This invention relates to an impact-resistant polymer composition based on a copolymer of an unsaturated nitrile, a substantially saturated rubber and a chlorinated polyethylene.

Generally, impact-resistant polymer compositions based on an unsaturated nitrile contain a graft polymer consisting of a rubber having one or more monomers grafted thereto. Examples of such monomers are styrene, α-methylstyrene, acrylonitrile, vinyl chloride, maleic anhydride and/or one or more acrylates. A typical composition is ABS, a copolymer of styrene and acrylonitrile grafted onto a butadiene rubber. Because the monomers forming the continuous phase are grafted onto the rubber, such compositions have a high impact resistance, especially at low temperatures (−20° C.).

The rubber used is often polybutadiene or a related rubber. These rubbers are, however, highly unsaturated, making them sensitive to oxidation when exposed to light and/or molecular oxygen. Consequently, objects made from polymer compositions containing such rubbers strongly deteriorate, and therefore, such polymer compositions have been largely precluded from outdoor use.

To solve this problem it has been proposed, for instance, in U.S. Pat. Nos. 3,886,233 and 4,202,948 to replace the rubber in the polymer composition by a substantially saturated rubber, such as an ethylene-propylene or an ethylene-propylene-diene rubber. A polymer composition may accordingly be obtained which combines good impact resistance with good UV stability.

A disadvantage, however, is that these graft copolymers exhibit rather poor flow behavior. Consequently, the speed of processing is low and problems may arise with respect to mold filling, especially when producing intricate objects. Compared with polymer mixtures, these graft copolymers therefore necessitate a rather complicated production process.

Japanese Patent Disclosure No. 3016/68 describes a polymer composition consisting of a styrene-acrylonitrile copolymer, chlorinated polyethylene and butyl rubber. From the text it appears that the chlorinated polyethylene is a homogeneous chlorinated polyethylene having a high density. However, the impact resistance of this polymer composition is low. Similarly, from U.S. Pat. No. 3,819,763 it is known that mixtures of chlorinated polyethylene, ethylene-propylene-diene rubber and a styrene-acrylonitrile copolymer exhibit low impact resistance.

U.S. Pat. Nos. 4,341,884 and 4,341,885 describe polymer compositions wherein, to improve impact resistance, use is made of a chlorinated polyethylene characterized by a combination of a certain chlorine content, a DSC crystallinity and, optionally, a glass transition temperature.

The polymer composition according to the present invention comprises:
A. 40–95 parts by weight of at least one copolymer obtained by polymerizing a mixture of:
  (1) 10–90 weight % of one or more monomers selected from the group consisting of styrene and derivatives thereof, and
  (2) 90–10 weight % of one or more monomers selected from the group consisting of acrylonitrile and methacrylonitrile; and
B. 5–60 parts by weight of a mixture comprising:
  (1) a substantially saturated rubber, and
  (2) chlorinated polyethylene having a chlorine content of from 32 to 45 weight %, a DSC crystallinity of 0–7% and an intrinsic viscosity of at least 1.0, and wherein the weight ratio between rubber and chlorinated polyethylene is from 2:1 to 1:10.

Advantageously, the intrinsic viscosity of the chlorinated polyethylene is between 1.2 and 3.5.

Surprisingly, it has been found that such a polymer composition, which includes a specific chlorinated polyethylene rather than a graft copolymer, not only exhibits good flow behavior and UV stability, but also possesses high impact resistance, even at low temperatures. Measurements have in fact shown the flow behavior of the instant polymer composition to be comparable to the flow behavior of ABS.

The high impact resistance is particularly surprising in view of the ingredients comprising the composition of this invention. That is, polymer compositions based on a copolymer of an unsaturated nitrile and chlorinated polyethylene, respectively on the basis of this copolymer and a substantially saturated rubber are known to exhibit little impact resistance, as previously noted. The same may be said for compositions based on the aforementioned three ingredients wherein the chlorinated polyethylene does not meet the intrinsic viscosity requirements of the present invention. Therefore, based on the state of the art and the preceding comments, the capability of producing high impact-resistant polymer compositions by employing a chlorinated polyethylene having a high intrinsic viscosity is unexpected.

In particular, it has been found that by employing a chlorinated polyethylene having an intrinsic viscosity in excess of 1.0, a polymer composition is obtained which exhibits a considerably higher impact resistance than that obtainable with a composition based on a comparable chlorinated polyethylene having a low viscosity. Quite unexpectedly, it has also been found that the use of such high-molecular weight materials results in little, if any, adverse effect on the processability of the polymer composition.

An additional advantage of the polymer composition of this invention is that the ratio between rubber, chlorinated polyethylene and the unsaturated nitrile copolymer can be varied within wide limits. Accordingly, great latitude exists for preparing polymer compositions having a broad range of desirable properties, including rigidity, heat distortion temperature (Vicat, HDT), impact strength, burning characteristics, gloss, in-mold shrinkage, flow behavior and processability. At the same time, there is no need to modify the preparation of any of the components, as is the case when preparing known products based on graft copolymers.

Suitable, substantially saturated rubbers for use in the invention contain little if any backbone unsaturation, i.e., such rubbers contain less than 2, and preferably less than 1.5, double bonds per 100 carbon atoms. The side chains of these rubbers, however, may be unsaturated, and this unsaturation desirably may be utilized for cross-linking.

Rubbers that are particularly suited for application in the process of this invention are ethylene-propylene copolymers (the so-called EP rubbers), butyl rubber, chloro-butyl rubber, acrylate rubber and ethylene-propylene copolymers containing other copolymerized polyunsaturated monomers (the so-called EPT rubbers), or mixtures of two or more of these rubbers. Examples of suitable polyunsaturated monomers are hexadiene-1,4, dicyclopentadiene, tricyclopentadiene, 5-vinyl norbornene-2, 5-ethylidene-norbornene-2, 5-methylene-norbornene-2, 5-(2-propenyl)norbornene-2, 5-(5-hexenyl)norbornene-2, 4,7,8,9,-tetrahydroindene and isopropylidene-tetrahydroindene. As it is not essential for the instant polymer composition to be vulcanized, it is optional to use any of these polyunsaturated monomers. Hence it may be economically advantageous solely to employ ethylene-propylene rubber in the composition.

In certain cases it may be advantageous to cross-link all or part of the rubber. This can be effected in the usual way, such as by using peroxides or by employing chemically modified rubber.

Suitably chlorinated polyethylene or a mixture of two or more chlorinated polyethylenes suitable for use in the polymer composition can be prepared as known in the art by chlorinating polyethylene in solution, in suspension or in the gas phase. Reference may be made, for example, to U.S. Pat. Nos. 3,935,181 and 4,197,386. The starting material preferably is high-density polyethylene, that is, polyethylene having a density of between 935 and 965 kg/m$^3$. This material can be made by employing a catalyst based on transition metals. Cross-linking of all or part of the chlorinated polyethylene can be effected, for example, with the aid of a diamine.

Crystallinity is determined by placing a chlorinated polyethylene sample in a differential scanning calorimeter, maintaining it for 5 minutes at 150° C., subsequently cooling it to 50° C., the cooling rate being 5° C. per minute, and then reheating it to 150° C. at a rate of 5° C. per minute. During reheating, the melting heat is measured. The crystallinity is then determined using the following formula: crystallinity (%) = melting heat measured (J/g) × 100% the melting heat of 100%
crystalline polyethylene (J/g)

The glass transition temperature of the chlorinated polyethylene is advantageously lower than or equal to +5° C. The lower limit is not critical. In practice, the lower limit of the glass transition temperature will be dictated by requirements regarding crystallinity and chlorine content, and generally will be about −35° C.

"Glass transition temperature" is here defined to mean the temperature at which the maximum damping (G″, loss modulus) occurs that is characteristic of the type of chlorinatedpolyethylene and that is measured using a torsion-damping meter at a frequency of 0.2153 Hz and a heating rate of 1° C. per minute.

In this context, it should be noted that chlorinated polyethylene usually has two transition temperatures. One transition temperature lies in the region of −120° C. The other transition temperature occurs at a higher value and varies with the way the chlorinated polyethylene is prepared. This latter transition temperature is the one generally referred to in the literature when the glass transition temperature of chlorinated polyethylene is discussed. Therefore, this latter temperature is also the one referred to as the glass transition temperature of chlorinated polyethylene in the present patent specification and claims.

The intrinsic viscosity may be determined as known in the art by dissolving the chlorinated polyethylene in trichlorobenzene and measuring this property at 135° C.

The preparation of the unsaturated nitrile copolymer can be carried out as a continuous or batch process, using suitable known techniques such as emulsion, suspension, solution and mass polymerization, or various combinations thereof. As comonomer, various monomers based on styrene or its derivatives can be employed.

Examples of resulting polymers that may be used are styrene-acrylonitrile copolymer, α-methylstyrene-acrylonitrile copolymer, styrene- or α-methylstyrene-acrylonitrile-maleic anhydride terpolymer and styrene-α-methylstyrene-acrylonitrile terpolymer, as well as copolymers of acrylonitrile with halogenated styrene, or mixtures of two or more of said polymers. In these examples, all or part of the acrylonitrile may be replaced by one or more other monomers such as maleic anhydride or a methacrylate.

Advantageously, the weight ratio between the rubber and the chlorinated polyethylene is between 2:1 and 1:10. Within these limits a polymer composition is obtained having a high impact resistance which is maintained even at low temperatures (−20° C.). Maintaining said ratio within this range yields a polymer composition having an extremely high impact resistance, which resistance is also retained at low temperatures (−20° C.). Most advantageously, optimum properties are obtained if the weight ratio is maintained within the still more narrow range between 1:1 and 1:4.

The polymer composition of this invention can be compounded as known in the art from various based materials, using conventional methods employed for this purpose. Depending on the form in which the basic components are available (powder, crumb, liquid), various devices or combinations thereof may be used, such as high-speed mixers, Banbury mixers, kneader-extruders and the like.

Since impact-resistant polymer compositions are supplied by producers mainly in granulated form, the polymer composition will generally be granulated using an extruder after the basic materials have been mixed. Mixing can also take place in the extruder.

A preferred polymer composition of this invention consists essentially of:

A. 30–94.99 weight % styrene-acrylonitrile copolymer and/or α-methylstyrene-acrylonitrile copolymer, and B-1 2.5–35 weight % ethylene-propylene or ethylene-propylene-diene rubber, and B-2 2.5–35 weight % chlorinated polyethylene, and C. 0.01–10 weight % additives.

This composition includes one or more additives selected from the group comprising anti-oxidants, antistatic agents, lubricants, reinforcing fillers, colorants, pigments, UV stabilizers, fungicides, hydrogen-chloride binding compounds, metal deactivators, flame retarding metal compounds, etc. Advantageously, the composition contains at least 50 weight % of copolymer component (A), as optimal impact resistance is thereby obtained. Correspondingly, the components (B), and (C) would total less than 50 weight %. Additionally, one or more other polymers may also be added to the composition. This is true particularly in the case of vinyl chloride polymers such as PVC.

A particularly suitable combination of stabilizing additives for use in the compositions of this invention is described in British Patent Specification No. 1,582,280 and comprising:

C-A. from 0.05 to 5% by weight, relative to the polymer composition, of at least one sterically hindered amine, and C-B. from 0.05 to 5% by weight, relative to the polymer composition, of at least one component selected from the group consisting of benzophenone derivatives, benzotriazoles, benzylidene malonates, phenyl salicylates, and substituted acrylonitriles, and C-C. from 0.005 to 5% by weight, relative to the polymer composition, of at least one component selected from the group consisting of phenol derivatives, organic phosphites and aromatic amines.

The polymer composition of the invention is particularly suitable for making objects that satisfy high requirements as regards mechanical and physical properties, including impact resistance, rigidity, etc., especially if these properties are to be coupled with UV resistance.

This polymer composition is suitable for many applications, and a wide range of impact-resistant objects can be made therefrom, including tubes, bottles, furniture, dashboards for cars, cabinets and casings for electronic and domestic equipment, shoe heels, caravans, skis and surfboards.

The desirable compositions of this invention are further illustrated by the examples which follow.

EXAMPLES I THROUGH XIV AND COMPARATIVE EXAMPLES A THROUGH E

Five polymer compositions were prepared from 75 parts by weight of styrene-acrylonitrile copolymer (SAN), 15 parts by weight of chlorinated polyethylene (CPE) and 10 parts by weight of ethylene-propylene-ethylidene norbornene rubber (EPT). The nitrogen content of the copolymer was 6.9% and the viscosity number 0.64 dl/g (0.1 g in 100 ml acetone at +20° C.). The EPT rubber employed had an ethylene content of 64 weight %, an ethylidene-norbornene content of 4 weight % and a Hoekstra plasticity of 65.

Table 1 successively presents the number of the example, the chlorine content in weight % of the CPE employed, the percentage of DCS crystallinity and the intrinsic viscosity of this CPE, the glass transition temperature in °C. of this CPE, the notched impact strength (ASTM D 256) and the flexural modulus (ASTM D 790) of the polymer composition.

TABLE 1

| Example | % Cl | % crystal-linity | η | $T_g$ (°C.) | Izod kJ/m$^2$ | Flexural modulus (N/mm$^2$) |
|---|---|---|---|---|---|---|
| I | 35.6 | 0 | 1.14 | — | 23.5 ± 8.6 | 2310 |
| II | 35.8 | 5 | 1.25 | −16 | 37 ± 5.9 | 2280 |
| III | 35.6 | 0 | 1.48 | −23 | 38 ± 12.2 | 2270 |
| IV | 36.2 | 0 | 2.00 | −20 | 54 ± 7.6 | 2270 |
| V | 36.7 | 0 | 2.35 | −24 | 58 ± 3.4 | 2210 |
| a | 41.2 | 0 | 0.85 | −10 | 7 ± 0.3 | 2350 |
| VI | 42.0 | 0 | 1.24 | −13 | 13 ± 1.3 | 2330 |
| VII | 38.9 | 0 | 1.39 | — | 13 ± 1.5 | 2210 |
| VIII | 42.6 | 0 | 2.22 | −17 | 39 ± 7.8 | 2340 |

Using the composition of Example IV, mixtures were prepared consisting of 75 parts by weight of SAN and 25 parts by weight of chlorinated polyethylene and rubber in varying proportions. The compositions and mechanical properties of these mixtures are given in Table 2.

TABLE 2

| Example | SAN (parts by weight) | CPE (parts by weight) | EPT (parts by weight) | Izod kJ/m$^2$ | Flexural modulus (N/mm$^2$) |
|---|---|---|---|---|---|
| b | 75 | — | 25 | 2 | 1290 |
| IX | 75 | 7.5 | 17.5 | 13 | 2260 |
| X | 75 | 10 | 15 | 36 | 2230 |
| XI | 75 | 12.5 | 12.5 | 57 | 2270 |
| IV | 75 | 15 | 10 | 54 | 2270 |
| XII | 75 | 17.5 | 7.5 | 47 | 2350 |
| XII· | 75 | 20 | 5 | 45 | 2400 |
| c | 75 | 25 | — | 8 | 2460 |

In Table 3, the influence of chlorine content of the CPE, outside of the range of this invention, on mechanical properties is indicated. This table successively presents the weight percentage of chlorine and the intrinsic viscosity of the chlorinated polyethylene, along with the impact resistance and the flexural modulus of the composition for two compositions containing 75 parts by weight of SAN, 15 parts by weight of CPE and 10 parts by weight of EPT.

TABLE 3

| Example | Cl content (wt. %) | η | Izod (kJ/m$^2$) | Flexural modulus (N/mm$^2$) |
|---|---|---|---|---|
| d | 29.2 | 1.37 | 6 | 2330 |
| e | 25.4 | 1.47 | 8 | 2200 |

We claim:

1. An impact-resistant polymer composition including an unsaturated nitrile-containing copolymer, at least one substantially saturated rubber and a chlorinated polyethylene comprising:

A. 40–95 parts by weight of at least one copolymer obtained by polymerizing a mixture of:
(1) 10–90 weight % of one or more monomers selected from the group consisting of styrene and derivatives thereof, and
(2) 90–10 weight % of one or more monomers selected from the group consisting of acrylonitrile and methacrylonitrile; and B. 5–60 parts by weight of a mixture comprising:
(1) a substantially saturated rubber, and
(2) chlorinated polyethylene having a chlorine content of from 32 to 45 weight %, a DSC crystallinity of 0–7% and an intrinsic viscosity of at least 1.0, and wherein the weight ratio between rubber and chlorinated polyethylene is from 2:1 to 1:10.

2. The composition of claim 1 wherein said copolymer is formed by polymerizing acrylonitrile with a monomer or both monomers selected from the group consisting of styrene and α-methylstyrene.

3. The composition of claim 1 wherein said rubber is selected from the group consisting of butyl rubber, acrylate rubber, chlorobutyl rubber, ethylene-proylene rubber, and ethylene-propylene-diene rubber.

4. An impact-resistant polymer composition based on an unsaturated nitrile-containing copolymer, at least one substantially saturated rubber and a chlorinated polyethylene, comprising:

A. 30–94.99 weight % of one or more copolymers selected from the group consisting essentially of styrene-acrylonitrile and α-methylstyrene-acrylonitrile, and B-1. 2.5–35 weight % of a substantially saturated rubber selected from the group consisting of ethylene-propylene, ethylene-propylene-diene, or butyl rubber, and B-2. 2.5–35 weight % of chlorinated polyethylene having a chlorine content of from 32 to 45 weight percent, ADSC crystallinity of 0–7% and an intrinsic viscosity of at least 1.0, C. 0.01–10 weight % additives.

5. The composition of claim 4 wherein said additives consist essentially of at least one component selected from the group consisting of anti-oxidants, antistatic agents, lubricants, reinforcing fillers, colorants, pigments, UV stabilizers, fungicides, hydrogen chloride binding compounds, metal deactivators, and flame retarding metal compounds.

6. The composition of claim 4 wherein said additives consist essentially of:

C-A. from 0.05 to 5% by weight, relative to the composition, of at least one sterically hindered amine, and C-B. from 0.05 to 5% by weight, relative to the composition, of at least one component selected from the group consisting of benzophenone derivatives, benzotriazoles, benzylidene malonates, phenyl salicylates, and substituted acrylonitriles, and C-C. from 0.005 to 5% by weight, relative to the composition, of at least one component selected from the grtoup consisting of phenol derivatives, organic phosphites, and aromatic amines.

7. An object fabricated at least in part of the composition of claims 1, 4 or 5.

* * * * *